(12) United States Patent
Carter et al.

(10) Patent No.: US 9,108,697 B2
(45) Date of Patent: Aug. 18, 2015

(54) FOLDING TRAILER (71) Applicants: Anna Lee Carter, Garden City, ID (US); Benjamin Chase Carter, Garden City, ID (US)

(72) Inventors: Anna Lee Carter, Garden City, ID (US); Benjamin Chase Carter, Garden City, ID (US)

( * ) Notice: Subject to any disclaimer, the term of this patent is extended or adjusted under 35 U.S.C. 154(b) by 0 days.

(21) Appl. No.: 14/257,715

(22) Filed: Apr. 21, 2014

(65) Prior Publication Data

US 2014/0216352 A1 Aug. 7, 2014

Related U.S. Application Data (63) Continuation-in-part of application No. 12/951,959, filed on Nov. 22, 2010, now Pat. No. 8,950,767.

(51) Int. Cl.
*B62K 27/12* (2006.01)
*B62K 27/00* (2006.01)
*A01K 1/00* (2006.01)
*B62D 63/06* (2006.01)

(52) U.S. Cl.
CPC ............. *B62K 27/003* (2013.01); *A01K 1/0035* (2013.01); *B62D 63/061* (2013.01)

(58) Field of Classification Search
CPC ... B62K 27/003; A01K 1/0035; B62D 63/061
USPC .................................. 280/204, 202, 292, 287
See application file for complete search history.

(56) References Cited

U.S. PATENT DOCUMENTS

| | | | | | |
|---|---|---|---|---|---|
| 5,687,980 | A | * | 11/1997 | Eckroth | 280/204 |
| 7,168,761 | B2 | * | 1/2007 | Britton et al. | 297/250.1 |
| 7,172,206 | B2 | * | 2/2007 | Staszak | 280/204 |
| 7,341,265 | B1 | * | 3/2008 | Liu | 280/204 |
| 7,354,058 | B2 | * | 4/2008 | Chou | 280/651 |
| 7,387,310 | B1 | * | 6/2008 | Liu | 280/642 |
| 7,475,901 | B2 | * | 1/2009 | Winter et al. | 280/656 |
| D633,825 | S | * | 3/2011 | van Leeuwen et al. | D12/101 |
| 8,444,173 | B1 | * | 5/2013 | Liu | 280/656 |
| 2002/0074764 | A1 | * | 6/2002 | Allen et al. | 280/204 |
| 2007/0284842 | A1 | * | 12/2007 | O'Donnell | 280/204 |

* cited by examiner

*Primary Examiner* — Kevin Hurley
*Assistant Examiner* — Michael Stabley
(74) *Attorney, Agent, or Firm* — Robert L. Shaver; Shaver & Swanson, LLP (57) ABSTRACT

A collapsible trailer for exercising or transporting an animal. The trailer is attachable to a vehicle, such as a bicycle, and features a floor capable of retracting into a running position where an animal is able to run on the ground and deploying into a riding position where an animal can ride without having to exert itself. The trailer is further capable of collapsing utilizing hinged connections between trailer sides in order to have the trailer fold flat to occupy a reduced floor area.

21 Claims, 5 Drawing Sheets

FOLDING TRAILER

PRIORITY/CROSS-REFERENCE TO RELATED APPLICATIONS

This application is a continuation-in-part and claims the benefit of U.S. Utility patent application Ser. No. 12/951,959, filed Nov. 22, 2010, the disclosure of which is incorporated by reference.

TECHNICAL FIELD

The invention generally relates to an apparatus for exercising a pet and more particularly to trailers connectable to bicycles or the like for exercising a pet.

BACKGROUND

Animals, including pets, are neither always sedentary nor always active, and pets, particularly dogs, should be exercised with walks or runs. Animal owners, too, should exercise. When both a pet dog is ready for a run and an owner is ready for physical activity, a bicycle ride with a dog in tow can make for a pleasant way for both owner and pet to get the exercise they need. However, riding a bicycle while holding a leash for a dog can be dangerous as dogs sometimes decide to run or walk in a direction other than the direction which the bike is heading. Such unwise decisions can pull the bicycle to the side and lead to accidents.

Further, it is can be difficult to predict for how long a pet will be able to walk or run. Taking a pet dog along on a bike ride can be troublesome should the dog become tired partway during the trip, and bicycles are often not configured to accommodate carrying a dog while also bicycling. One alternative is to go for a bicycle ride while simply carrying the animal in a trailer towed behind the bicycle, but this does not allow the dog to get the exercise that it needs.

SUMMARY OF THE DISCLOSURE

The present running and riding trailer allows a user to switch between a configuration conducive for exercising an animal, such as a pet dog, a configuration conducive for transporting a resting animal, and a configuration conducive to storage of the trailer. As such, the trailer can be used before, during, and after exercising a pet.

More particularly, the running and riding trailer includes a frame to which is attached an attachment arm configured to connect the trailer to a vehicle, such as a bicycle, tricycle, scooter, or the like. The frame also includes a first side, a second side, and a front side that together define a bottom area. At least one floor panel, supportable by the frame, is included. The floor panel is configured to selectively transition between a riding position and a running position.

When the floor panel is in its riding position, the floor panel is supported by the frame of the trailer, and the floor panel at least partially spans the bottom area of the frame. In this position, an animal may sit upon the floor panel and ride along with the trailer as it is pulled by the vehicle.

The floor panel is selectively transitioned from the riding position to a running position by at least partially removing the floor panel from the bottom area. In some embodiments, the floor panel is physically detached from the frame and removed completely from the bottom area. In other embodiments, the floor panel is folded or otherwise moved partially away from the maximum floor area it had occupied to expose part of the bottom area. In still other embodiments, the floor panel is pivoted away from the bottom area, to expose the bottom area to the ground beneath the trailer. Thus, when the floor panel is in its running position, an open area in the bottom area of the frame is provided within which an animal may stand, walk, or run within the confines of the first and second sides of the frame of the trailer.

When the floor panel is in the running position, the user can selectively transition the trailer from the running position to a collapsed position. The collapsed position allows the sides to become substantially parallel and the bottom area approaches zero. This configuration is accomplished by attaching the sides and any other accessories using rotatable hinges, such as a flat male connector and a slotted female connector with a pin passing through both the female connector and the male connector. This pin provides for an axis of rotation around which the pieces can rotate. During the transition between the running position and the collapsed position the bottom area passes through a shape that is a parallelogram rather than the rectangular shape present during the running and riding positions.

The trailer further includes a leash attachment point supported by the frame, such as by a leash bar extending between the first side and second side of the frame of the trailer. At least one leash can be detachably connected to the leash attachment point so as to tether an animal to the trailer.

Accordingly, when the floor panel is in its running position, an animal may be exercised by moving under its own power in connection with the trailer to which it is leashed as the trailer is pulled by the vehicle. When the animal becomes tired of running or walking, the floor panel can be repositioned into the riding position so that the animal can finish the journey while riding along on the floor panel.

Because the floor panel of the trailer is selectively transitionable between the running and riding positions, the trailer is conducive for use by someone wanting to exercise a pet during only part of a bicycle ride. Further, because the pet need not walk or run the entire distance traveled by the vehicle, the vehicle operator can go on a long bicycle ride with his or her pet or pets where the ride would otherwise have to be cut short due to the pet's or pets' inability to walk or run the entire distance of the trip.

Additionally, when the floor panel is in the running position, because the animal utilizing the trailer is kept in a position moving with the trailer between the first side and second side of the frame of the trailer, the animal is encouraged to travel in line with the direction of travel of the vehicle to which the trailer is attached. Accordingly, a person traveling forward on his or her bicycle, pulling a trailer with a dog running inside, will not be pulled to one side or the other by the dog.

The first and second sides of the frame of the trailer also discourage other animals from having access to the animal utilizing the trailer. In some embodiments, panels are also attached to the first and second sides of the frame, making it even more difficult for a stray animal to have unwanted access to the pet within the trailer.

In some embodiments of the trailer, two floor panels are included, each of which can be selectively transitioned between a running and a riding position. Accordingly, the trailer can be used with two pet dogs, allowing both dogs to run together, both dogs to ride together, or one dog to ride while the other dog runs. Thus, one tired dog does not prevent another energetic dog from continuing to enjoy a long walk or run.

The purpose of the Summary is to enable the public, and especially the scientists, engineers, and practitioners in the art who are not familiar with patent or legal terms or phraseology to determine quickly, from a cursory inspection, the nature and essence of the technical disclosure of the application. The Summary is neither intended to define the invention of the application, which is measured by the claims, nor is it intended to be limiting as to the scope of the invention in any way.

Still other features and advantages of the claimed device will become readily apparent to those skilled in the art from the following detailed description describing preferred embodiments of the device, simply by way of illustration of the best mode contemplated by carrying out the device. As will be realized, the device is capable of modification in various obvious respects all without departing from the invention. Accordingly, the drawings and description of the preferred embodiments are to be regarded as illustrative, and not restrictive.

DEFINITIONS

In the following description and in the figures, like elements are identified with like reference numerals.

The use of "e.g.," "etc," and "or" indicates non-exclusive alternatives without limitation unless otherwise noted.

The use of "including" means "including, but not limited to," unless otherwise noted.

DETAILED DESCRIPTION OF THE EXEMPLARY EMBODIMENTS

While the running and riding trailer is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in FIGS. 1 through 8, trailer 10 includes a frame 56 that supports at least one floor panel that is configured to transition between a running configuration, in which the floor panel occupies a minimal portion of the bottom area 72 of a frame and such that the interior of the trailer 10 is exposed to the ground, and a riding configuration, in which the floor panel covers at least a portion of the bottom area 18, thereby providing a supportive floor. Therefore, when the floor panel is in the running configuration, an animal, such as a pet dog, using the trailer 10 can walk or run along in connection with the bicycle or other vehicle to which the trailer 10 is attached. Alternatively, when the floor panel is in the riding configuration, the animal is carried and rides along in the trailer 10 as the bicycle or other vehicle travels. When the floor panel is in the running configuration, the frame 56 is further configured to selectively transition into a collapsed position. When in the collapsed position the frame 56 occupies a minimal space with the bottom area 18 reducing to near zero.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

Figure 1:
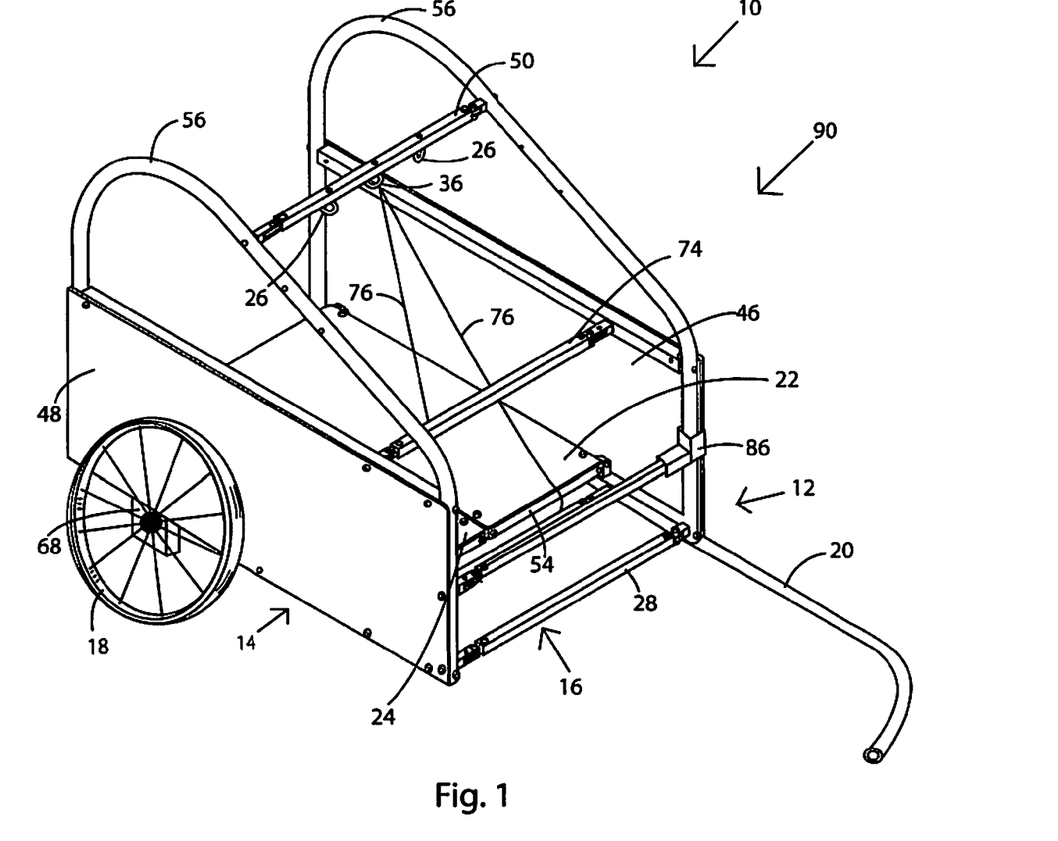
FIG. 1 is a perspective view of the top, front, and right sides of a trailer according to an embodiment of the inventive concepts configured in a riding position.
Figure 2:
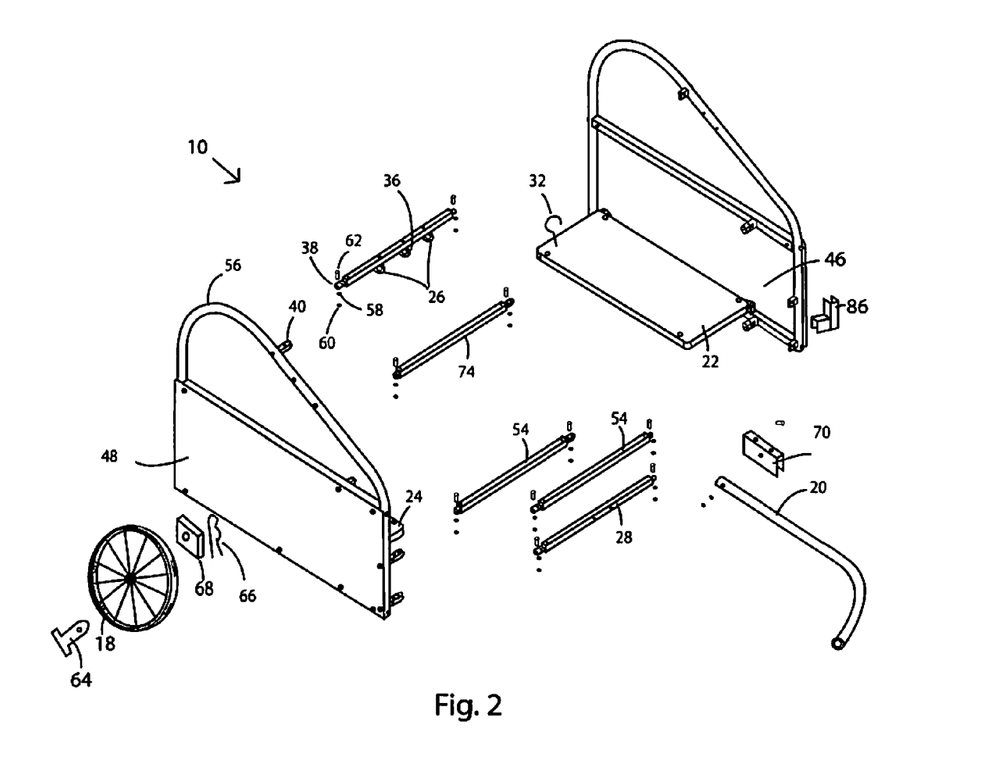
FIG. 2 is an exploded view of a trailer according to an embodiment of the inventive concepts.
Figure 4:
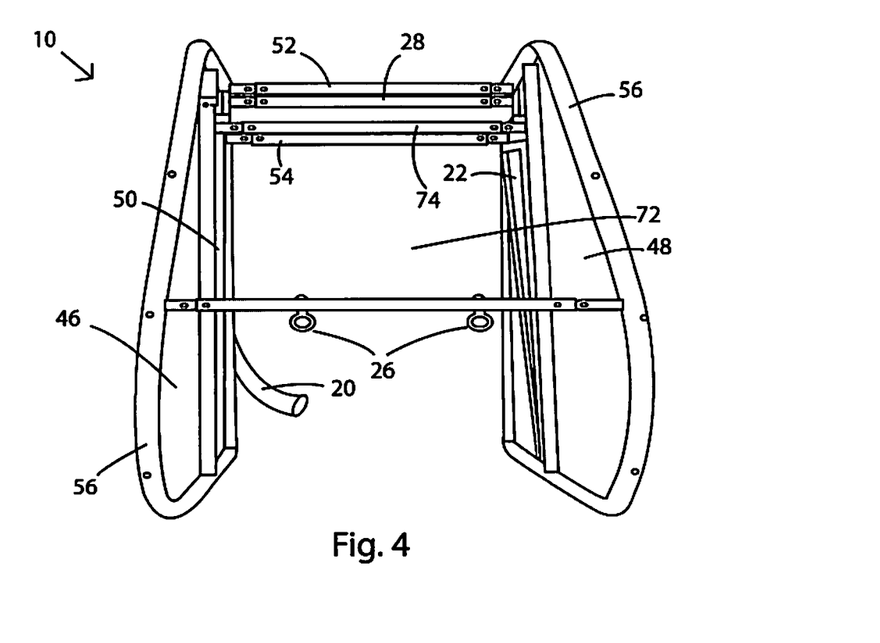
FIG. 4 is a top view of a trailer according to an embodiment of the inventive concepts in the running position.
Figure 5:
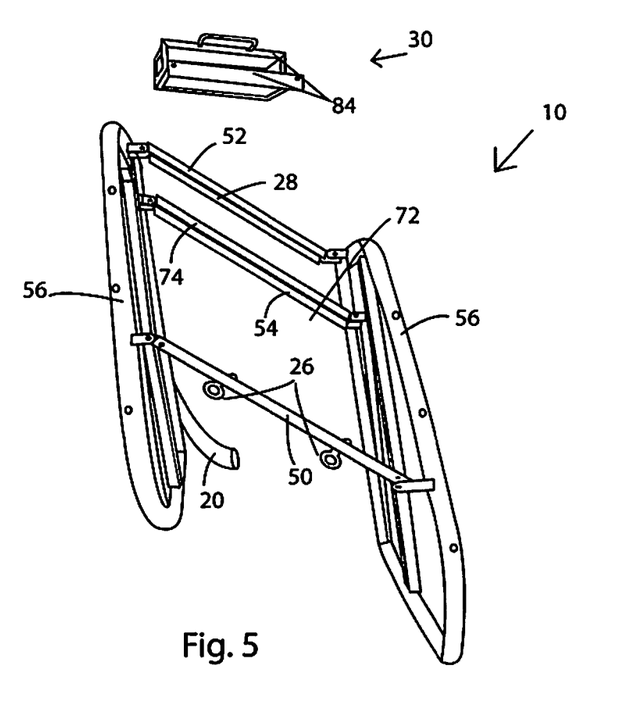
FIG. 5 is a top view of a trailer according to an embodiment of the inventive concepts configured in a transition state between a running position and a collapsed position.
Figure 6:
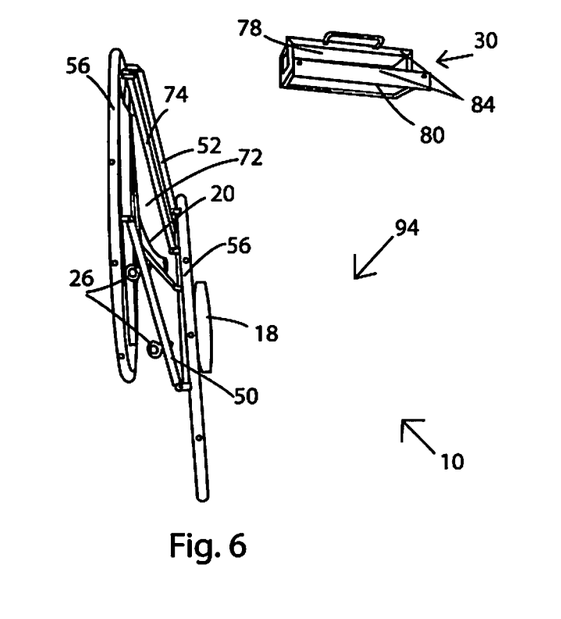
FIG. 6 is a top view of a trailer according to an embodiment of the inventive concepts configured in a transition state between a running position and a collapsed position.

As shown in FIG. 1, the trailer 10 includes a frame 56 that has a first side 12, a second side 14 and a front side 16. A bottom area 72 is defined by the first side 12, second side 14, and front side 16 which also border the bottom area 72. According to the depicted preferred embodiment of the riding position 90, the first side 12 and second side 14 define side areas that extend upward and perpendicularly from the bottom area 72. Such first side 12, second side 14 and front side 16 define a trailer with dimensions that accommodate carrying an animal fully within the trailer 10. In other embodiments, the trailer 10 includes a first side 12 and a second side 14 that do not extend upwardly, such that the resulting trailer 10 is essentially flat when in the riding position. In the depicted embodiment, front side 16 is connected to first side 12 and second side 14 at a 90 degree angle. The connection between first side 12 and front side 16 and the connection between second side 14 and front side 16 are made utilizing male joint connector 38 and female joint connector 40. Although female connectors are shown attached to sides 48 and 46, the male and female connectors can be reversed with the same affect. The connectors are held together by placing bolt 62 through adjacent holes in the connectors, then placing bolt 62 through washer 58, and finally securing bolt 62 by applying nut 60. In the depicted embodiment, as shown in FIG. 3-6, these connectors are configured to selectively transition in a horizontal plane from a substantially 180 degree angle between the male connector 38 and female connector 40 for the running position 92 and riding position 90 to a substantially 90 degree angle for the collapsed position 94. When transitioning from the running position 92 to the collapsed position 94 the bottom area 72 forms a parallelogram shape, as shown in FIGS. 4-6. Further, a frame retainer 86 is included to selectively hold the frame in the running position or the collapsed position. The frame retainer can be of multiple designs, such as a bracket configured to fit over the front side 16 and the first side 12 or second side 14 of the frame 12 as shown in FIG. 1 and FIG. 2. In the embodiment depicted in FIG. 3, the frame retainer is storage structure 30. Storage structure 30, which is detailed below, also allows for placement of small items, such as wallets, keys, and the like.

Focusing on FIG. 2, in order to facilitate movement, at least one wheel is attached. In the depicted embodiment one wheel 18 is attached to the first side 12 and the second side 14 of the frame 56. In a preferred embodiment, each wheel 18 is attached using a wheel axle 64 that passes through the center of wheel 18. The wheel axle 64 then passes through a wheel block 68. A wheel block 68 is attached to the first side 12 and second side 14 using screws or pins. To secure the wheel axle 64, and prevent disconnection of the wheel during movement, wheel clip 68 is passed through a hole near the end of wheel axle 64 that has passed through wheel block 68.

Attachment arm 20 is supported by the frame 12. The attachment arm 20 is configured to connect the trailer 10 to a vehicle, such as a bicycle, scooter, tricycle, four-wheel vehicle, or the like. According to the depicted embodiment, the attachment arm 20 extends from the front of the frame 56, such that when the trailer 10 is connected to the vehicle, the trailer 10 travels behind the vehicle and in the same line of travel as the vehicle. Also according to the depicted embodiment, the attachment arm 20 is configured to attach to the axle of a bicycle and to be selectively detachable from the vehicle. Further, as shown in the figures, in some embodiments the attachment arm 20 extends from the frame 56 in alignment with the plane defined by the bottom area 72 of the frame 56. The attachment arm 20 is attached to the frame 56 using arm connector 70. The arm connector 70 preferably forms a pathway that allows the attachment arm 20 to rotate downward and rearward so that the attachment arm 20 is positioned beneath the trailer 10. Other designs are acceptable, such as rotating the attachment arm 20 horizontally until the attachment arm 20 is beneath trailer 10.

At least one floor panel is supported by the frame 12. According to the depicted preferred embodiment, the frame 12 supports two floor panels, a first floor panel 22 and a second floor panel 24. Preferably, each floor panel, including the first floor panel 22 and second floor panel 24, is configured to selectively transition between a riding position and a running position. In some embodiments incorporating more than one floor panel, a first floor panel 22 may be configured to transition between a riding position and a running position, while a second floor panel 24 is configured for only one position and not to transition between positions.

In the riding position 90, shown in FIG. 1, the floor panel at least partially spans the bottom area 72 of the trailer 10, thereby occupying a maximum floor area. In this position, the floor panel is configured to support an animal. In the running position 92, as shown in FIG. 4, the floor panel is at least partially removed from the bottom area 72 of the frame 12 so as to occupy a minimal floor area. Preferably, this minimal floor area occupied by the floor panel in the running position is equivalent to none of the maximum floor area occupied when the floor panel is in the riding position. As such, more of the bottom area 72 is exposed to the ground when the floor panel is in the running position than when the floor panel is in the riding position. Additionally, the floor panels and side panels can incorporate floor retainers 32 in order to secure the panels in the running position.

In some embodiments, each floor panel transitions between the riding position 90 and the running position 92 by being at least partially removed from the bottom area 72. In some such embodiments, the floor panel is fully removed and disconnected from the frame 56 to accomplish the transition between the riding position and running position. In other such embodiments, the floor panel is partially removed by folding or sliding a portion of the floor panel to expose part of the bottom area 72 to the ground beneath.

According to the preferred depicted embodiment, each floor panel 22 and 24 transitions between the riding position and the running position by pivoting about the side of the frame 12 to which the floor panel 22 and 24 is attached. As such, when the floor panel is positioned in the riding position, the floor panel and the bottom area 72 define a first pivot angle. Preferably this first pivot angle is equal to 0 degrees, such that the floor panel 22 and 24 extends from the side of the frame 12 to which it is attached in alignment with the plane defined by the bottom area 72. When the floor panels 22 and 24 are positioned in the running position, the floor panels 22 and 24 each define a second pivot angle with the bottom area 72 that is greater than the first pivot angle. Preferably, the second pivot angle is approximately equal to 90 degrees, such that the floor panel extends upwardly and perpendicularly from the plane defined by the bottom area 72.

According to embodiments utilizing only one floor panel, such a floor panel preferably has a width essentially equal to the width of the bottom area 72 defined by the first side 12, second side 14, and front side 16 of the frame 56. As such, when the single floor panel is placed in the riding position, the floor panel spans essentially the entirety of the bottom area 72. In some such embodiments, the single floor panel is pivotally connected to and supported by the first side 12 of the frame 56. In other such embodiments, the single floor panel is pivotally connected to and supported by the second side 14 of the frame 56.

Figure 3:
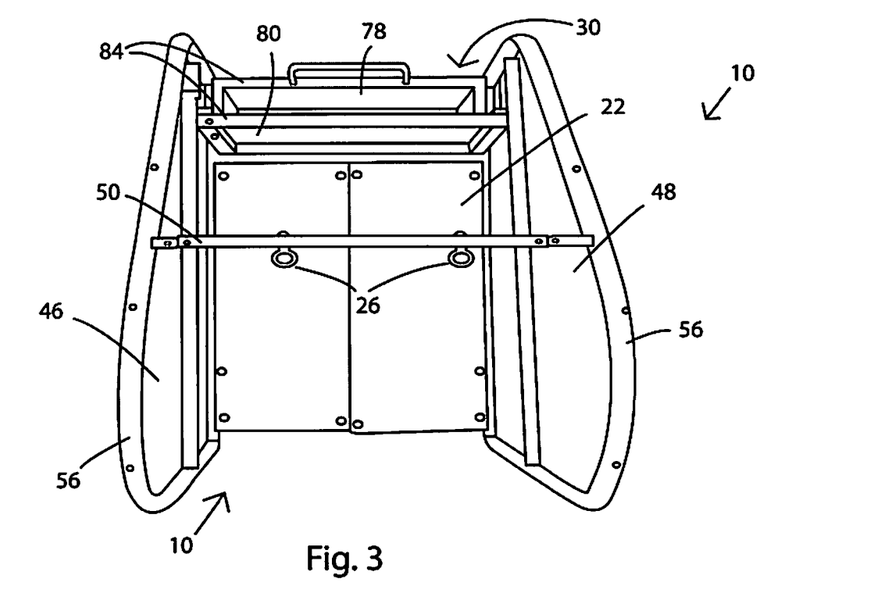
FIG. 3 is a top view of a trailer according to an embodiment of the inventive concepts in the riding position.
Figure 8:
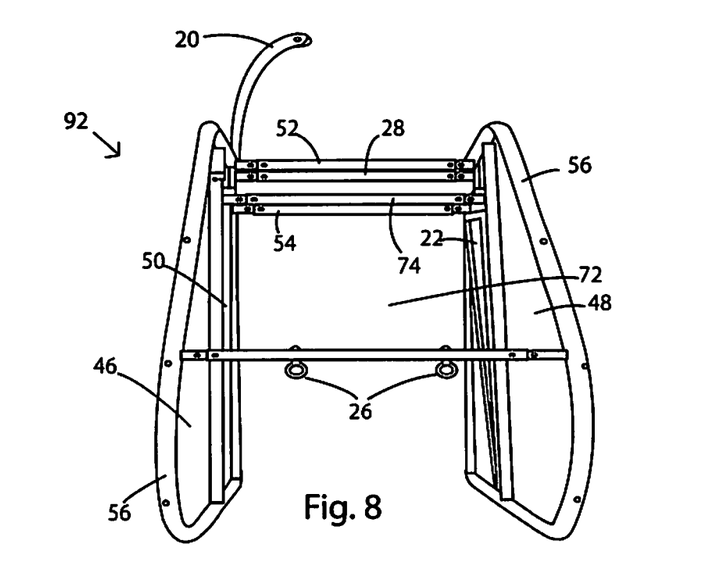
FIG. 8 is a top view of the trailer in a running position.

As shown in the figures, the first floor panel 22 and second floor panel 24 transition from the riding position 90, shown in FIGS. 1 and 3, and the running position 92, shown in FIG. 8, by selectively pivoting about the first side 12 and second side 14 of the frame 56, respectively. That is, the first floor panel 22 transitions from its riding position to its running position by pivoting the first floor panel 22 about a connection to the first side 12 of the frame 12. Likewise, the second floor panel 24 transitions from its riding position to its running position by pivoting the second floor panel 24 about a connection to the second side 14 of the frame 12.

The trailer 10 further includes at least one leash attachment point configured to support a leash that is configured to detachably tether an animal to the trailer 10. According to the depicted embodiment, the trailer 10 includes a leash bar 50 extending between the first side 12 and second side 14 of the frame 56. The leash bar 50 includes at least one leash attachment point 26 configured to receive one end of a leash. In a preferred embodiment, leash bar 50 further includes at least one flooring supporter 36. When a floor panel is lowered into the riding position, cable connector 76, which is attached to flooring supporter 36, can be selectively connected to the floor panels. According to the embodiment depicted in FIG. 3-6, the leash bar 50 is selectively rotatable via connection to the frame 54. As such, the leash bar 50 further contributes to the structural stability of the frame 12 and accommodates tethering of an animal or animals utilizing the trailer 10 both as the animal or animals are carried by a floor panel in the riding position or as the animal or animals run or walk behind the vehicle, beneath the leash bar 50, and between the first side 12 and second side 14 of the frame 12. The leash bar 50 is connected to the first side 12 and second side 14 using a male joint connector and a female joint connector. In the depicted embodiment, these connectors are configured to selectively transition in a horizontal plane from a substantially 180 degree angle for the running position and riding position to a substantially 90 degree angle for the collapsed position.

With particular attention to FIG. 1, the trailer 10 of the depicted embodiment further includes a first side panel 46 connected to the first side 12 of the frame 56 and a second side panel 48 connected to the second side 14 of the frame 56. The first side panel 46 and second side panel 48 provide a type of side walling for the trailer 10 and contribute to encouraging the animal or animals utilizing the trailer 10 to continue to advance forward, not to the side, while the trailer 10 is in motion. The first side panel 46 and second side panel 48 further prohibit outside animals from having ready access to the animal or animals within the trailer 10. In the depicted embodiment, the first side panel 46 and second side panel 48 extend perpendicularly upward from the bottom area 72 of the frame 56. As such, in this embodiment, the second side panel 48 stands essentially parallel with the first side panel 46, and together they provide a wagon-like structure for the trailer 10. In other embodiments, the trailer 10 is configured so as to more resemble a tent-like structure wherein the first side panel 46 and second side panel 48 extend upwards from the bottom area 56 at an angle toward one another. In other embodiments the side panels can be incorporated into the sides of the frame. In another embodiment the first side 12 can be formed from a single piece rather than frame 56 and first side panel 46 and the second side 14 can be formed from a single piece rather than frame 56 and second side panel 48.

In some embodiments, such as shown in FIG. 1, the front side 16 of the frame 56 utilizes at least one cross member connected to the first side 12 and second side 14 of the frame 56. The cross members are preferably attached using male joint connector 38 and female joint connector 40. In the depicted embodiment first cross member 28 is attached near the front of the first side 12 and second side 14 of the frame 56. First side 12 and second side 14 of the frame 56 extend upward perpendicular to the bottom area 72. A second cross member 52 is attached to the first side 12 and second side 14 at a location above the first cross member 28. A third cross member 54 is attached to the first side 12 and second side 14 at a location behind the first cross member 28. A fourth cross member 74 is attached to the first side 12 and second side 14 at a location above the third cross member 54 and behind the second cross member 52. In a preferred embodiment the cross members form a polygonal structure having a flat bottom with edges defined by the first cross member and third cross member, a substantially vertical side with edges defined by the first cross member 28 and the second cross member 52, a second substantially vertical side with edges defined by the third cross member 54 and the fourth cross member 74, and a sloping top defined by the second cross member 52 and the fourth cross member 74.

Turning to FIG. 3, in some embodiments a storage structure 30 is included. Preferably storage structure 30 is configured to be removably supported by the cross members. In a preferred embodiment the storage structure 30 features storage structure first side 78 connected at a substantially 90 degree angle to storage structure bottom 82 and storage structure second side 80 connected at a substantially 90 degree angle to storage structure bottom 82. Both storage structure first side 78 and storage structure second side 80 extend from storage structure bottom 82 in the same direction. Storage structure first side 78 and storage structure second side 80 further include storage structure supports 84. Storage structure supports 84 are configured to support the storage structure 30 on cross members 52 and 74. While different designs are acceptable, in a preferred embodiment storage structure supports 84 are tabs extending horizontally from storage structure first side 78 and storage structure second side 80. Additionally, storage structure 30 can be used in addition to frame retainer 86 or the storage structure 30 can function as the frame retainer.

FIG. 4 shows trailer 10 having the storage structure removed as well as having first floor pane 22 folded upward. Further the attachment arm 20 is folded underneath trailer 10. This is a configuration achievable during the transition from the running position to the collapsed position. Alternatively, the attachment arm 20 can be folded underneath the trailer after frame 56 has been folded into a substantially flat configuration and bottom area 72 has been reduced to a minimum area.

FIG. 5 shows trailer 10 continuing to fold into the collapsed position. Here storage structure 30 is shown removed from the trailer 10 and bottom area 72 forms a parallelogram as frame 56 collapses into a substantially flat configuration and bottom area 72 reduces to a minimum area. Additionally, any frame retainer has been removed prior to beginning the transition of trailer 10 from the running position to the collapsed position. As trailer 10 transitions to the collapsed position first crossmember 28, second crossmember 52, third crossmember 54, fourth crossmember 74, and leash bar 50 remain parallel while moving from a perpendicular orientation with frame 56 to a near parallel orientation.

FIG. 6 shows trailer 10 in collapsed position 94 and storage structure 30 separated from trailer 10. In this position bottom area 72 has been reduced to a minimum. Further, attachment arm 20 is folded underneath frame 56 in order to minimize the space required to store trailer 10 while in collapsed position 94.

Figure 7:
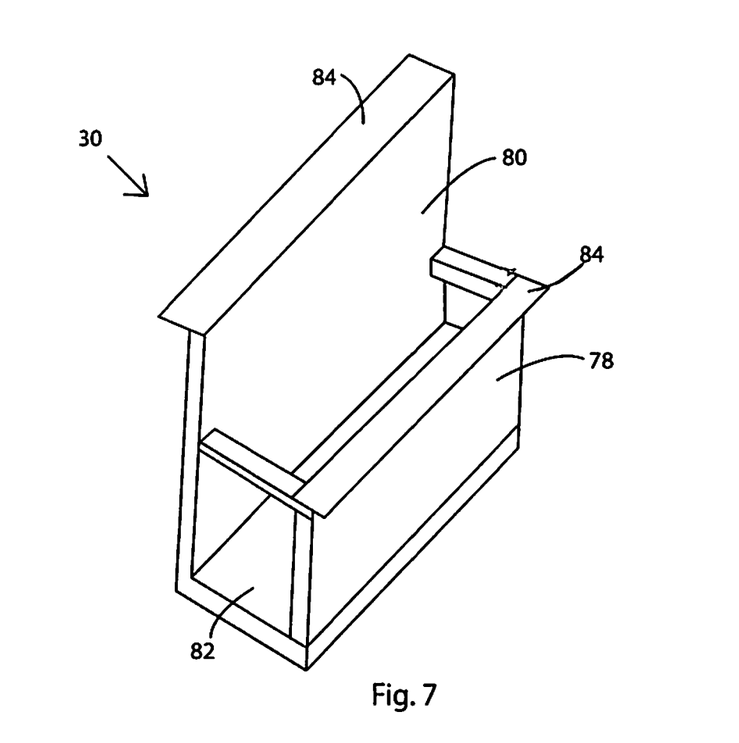
FIG. 7 is a perspective view of a storage container according to an embodiment of the inventive concepts.

FIG. 7 shows storage structure 30. In this embodiment storage structure 30 is made of storage structure first side 78, storage structure second side 80, storage structure bottom 82, and storage structure supports 84. Storage structure first side 78, storage structure second side 80, storage structure bottom 82, and storage structure supports 84 are each flat and rectangular, having 4 edges creating four square angles. Storage structure first side 78 is connected on one edge to an edge of storage structure bottom 82 at a substantially perpendicular angle. Storage structure second side 80 is connected on one edge to an edge of storage structure bottom 82 opposite the edge to which storage structure first side 78 is connected. Storage structure second side 80 is connected to storage structure bottom 82 as a substantially perpendicular angle and extends away from storage structure bottom 82 in the same direction as storage structure first side 78. Storage structure supports 84 are connected the edges of storage structure first side 78 and storage structure second side 80 which are opposite the connection to storage structure bottom 82. Storage structure supports 84 are connected at substantially perpendicular angles and extend in the opposite direction of storage structure bottom 82.

FIG. 8 shows the trailer in running position 92. In this position first floor panel 22 has been folded upward to be parallel with first side panel 48. Attachment arm 20 extends in front of frame 56 to allow attachment to a bicycle or other vehicle. In the running position the frame can be held together with various frame retention devices such as locking pins, a frame retainer as discussed above, or the storage structure as discussed above.

Notably, according to the preferred embodiment, the position of the first floor panel 22 is not dependent upon the position of the second floor panel 24. Therefore both the first floor panel 22 and second floor panel 24 can be selectively positioned in the riding position such that both the first floor panel 22 and second floor panel 24 are configured to carry and transport a first and second animal as the trailer 10 moves; or the first floor panel 22 and second floor panel 24 can be selectively positioned in their running positions such that both the first floor panel 22 and second floor panel 24 are configured to exercise a first and second animal as trailer 10 moves; or the first floor panel 22 can be positioned in its riding position while the second floor panel 24 is positioned in its running position such that a first animal can ride in the trailer 10 while a second animal is exercised; or, finally, the first floor panel 22 can be positioned in its running position while the second floor panel 24 is positioned in its riding position, such that a first animal is exercised while a second animal rides in the trailer 10.

The exemplary embodiments shown in the figures and described above illustrate, but do not limit, the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments contemplate use of the trailer 10 with dogs, the trailer 10 is not limited to use with dogs. Further, while the figures depict a rectangular trailer 10, in other embodiments, the trailer 10 is differently shaped. Still further, while the figures depict the floor panels being secured in only an essentially-flat riding position or an essentially-vertical running position, the floor panels may be secured at other positions relative to the frame 12 and bottom area 72. Hence, the foregoing description should not be construed to limit the scope of the invention, which is defined in the following claims. Further, it will be apparent that various changes may be made without departing from the spirit and scope of the invention, as defined by the following claims.

What is claimed is:

1. A trailer for attachment to a vehicle, said trailer comprising
    a frame having a first side, a second side, and a front side, and defining a bottom area bordered by said first side, second side, and front side;
    at least one wheel attached to said frame;
    an attachment arm connected to said frame, said attachment arm being configured to connect said trailer to said vehicle;
    at least one floor panel hingedly attached to said frame, said floor panel being configured to transition between:
        a riding position, in which said floor panel is supported by said frame and at least partially spans said bottom area of said frame to provide a generally horizontal floor panel suitable for support of an animal; and
        a running position, in which said at least one floor panel is rotated to a generally vertical position, to allow an attached animal to run or walk on the ground under the trailer, which enclosed with said frame;
    a leash attachment point supported by said frame, said leash attachment point configured for attachment of a leash, said leash being configured to detachably tether said animal to said trailer;
    whereby, when said at least one floor panel is positioned in said riding position, said trailer is configured to carry and transport said animal as said vehicle moves; and
    whereby, when said at least one floor panel is positioned in said running position, said trailer is configured so that said animal in contact with the ground and within the frame of the trailer, and free to move under its own power inside said trailer;
    said frame configured to selectively transition between said generally rectangular running position and
        a generally flattened collapsed position, by the first and second sides moving in a parallelogram fashion, connected to each other by a plurality of cross members, with said collapsed position with said first side, said second side, and said front side substantially parallel, said bottom area substantially gone; and
        a frame retainer configured to hold said frame in said running position or said collapsed position.

2. The trailer of claim 1 which further comprises a left and a right floor panel, positioned inside said frame and hingedly attached to said frame, forming a full or partial trailer floor when either floor panel is moved to a horizontal position, and forming a floorless trailer when said left and right floor panels are moved to a vertical position.

3. A trailer for attachment to a vehicle, said trailer comprising
    a frame having a first side, a second side, and a front side, and defining a bottom area bordered by said first side, second side, and front side;
    at least one wheel attached to said frame;
    an attachment arm connected to said frame, said attachment arm being configured to connect said trailer to said vehicle;
    a left and a right floor panel, positioned inside said frame and hingedly attached to said frame, forming a full or partial trailer floor when either floor panel is moved to a horizontal riding position, and forming a floorless trailer when said left and right floor panels are moved to a vertical running position
    a leash attachment point supported by said frame, said leash attachment point configured for attachment of a leash, said leash being configured to detachably tether said animal to said trailer;
    whereby, when said at least one of said floor panels is positioned in said riding position, said trailer is configured to carry and transport said animal as said vehicle moves; and
    whereby, when said at least one of said floor panels is positioned in said running position, said trailer is configured so that said animal can be in contact with the ground and within the frame of the trailer, and free to move under its own power inside said trailer;
    said frame configured to selectively transition between said generally rectangular running position and
        a generally flattened collapsed position, by the first and second sides moving in a parallelogram fashion, connected to each other by a plurality of cross members, with said collapsed position with said first side, said second side, and said front side substantially parallel, said bottom area substantially gone; and
    a frame retainer configured to hold said frame in said running position or said collapsed position.

4. The trailer of claim 1 wherein:
    said front side comprises at least one cross member connecting said first side and said second side, said cross members configured to support a storage structure;
    said storage structure comprising a front side, a back side and a bottom side;
    said sides being substantially flat and rectangular;
    said storage structure configured to rest on said cross member;
    said frame configured to accept said storage structure when in said expanded position;
    said storage structure configured to prevent said frame from transitioning from said expanded position to said collapsed position when said storage structure is placed on said cross members.

5. The trailer of claim 2 wherein said storage structure is said frame retainer.

6. The trailer of claim 2 wherein:
    said front side comprises two cross members, staggered horizontally, defining a separation space configured to accept said storage structure;
    said sides of said storage structure further comprising horizontal supports configured to support said storage structure on said cross members.

7. The trailer of claim 4 wherein:
said cross members are staggered vertically; and
said horizontal supports being staggered vertically to allow said supports to rest on said cross members with said bottom side of said storage structure being substantially parallel with the ground.

8. The trailer of claim 1 further comprising:
a first side panel supported by said first side of said frame, said first side panel extending perpendicularly from said bottom area of said frame; and
a second side panel supported by said second side of said frame, said second side panel extending perpendicularly from said bottom area of said frame.

9. The trailer of claim 6 further comprising a front side panel supported by said front side of said frame, said front side panel extending perpendicularly from said bottom area of said frame.

10. The trailer of claim 6, further comprising a floor panel retainer configured to selectively hold said floor panel in said running position.

11. The trailer of claim 1, wherein said floor panel has a width essentially equal to said bottom area's width; whereby, when said floor panel is in said riding position, said floor panel spans essentially the entirety of said bottom area.

12. The trailer of claim 1, wherein floor panel defines a plurality of holes.

13. The trailer of claim 1, wherein said first side of said frame and said second side of said frame are selectively connected to one another via detachable frame connectors.

14. The trailer of claim 1, further comprising a detachable leash bar extending between said first side and said second side, said leach attachment point being located along said leash bar.

15. The trailer of claim 12, further comprising a flooring supporter connected to said leash bar, said flooring supporter being configured to selectively support said floor panel in said riding position.

16. The trailer of claim 1 having one wheel attached to said first side of said frame and a second wheel attached to said second side of said frame;
said wheels configured to allow said trailer to roll when pulled by said vehicle.

17. The trailer of claim 1, further comprising a detachable leash bar extending between said first side and said second side, said leash attachment point being located along said leash bar.

18. The trailer of claim 1 wherein said front side comprises a flooring supporter configured to selectively support said floor panel in said riding position.

19. The trailer of claim 1 wherein said attachment arm is rotatably attached to said frame;
said attachment arm being configured to selectively transition between:
a first position wherein said attachment arm is configured for attachment to a vehicle;
a second position wherein said attachment arm has rotated to a position underneath said trailer, said second position placing said attachment arm substantially underneath said trailer when said trailer is in said collapsed position.

20. The trailer of claim 18, further comprising:
a first side panel supported by said first side of said frame, said first side panel extending perpendicularly from said bottom area of said frame; and a second side panel supported by said second side of said frame, said second side panel extending perpendicularly from said bottom area of said frame.

21. The trailer of claim 18, further comprising a front side panel supported by said first side and said second side of said frame, said front side panel extending perpendicularly from said bottom area of said frame.

\* \* \* \* \*